(12) United States Patent
El-Mahdy et al.

(10) Patent No.: US 7,979,672 B2
(45) Date of Patent: Jul. 12, 2011

(54) MULTI-CORE PROCESSORS FOR 3D ARRAY TRANSPOSITION BY LOGICALLY RETRIEVING IN-PLACE PHYSICALLY TRANSPOSED SUB-ARRAY DATA

(75) Inventors: Ahmed H. M. R. El-Mahdy, Alexandria (EG); Ali A. El-Moursy, Cairo (EG); Hisham ElShishiny, Giza (EG)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/180,468

(22) Filed: Jul. 25, 2008

(65) Prior Publication Data

US 2010/0023728 A1   Jan. 28, 2010

(51) Int. Cl.
*G06F 15/80* (2006.01)
(52) U.S. Cl. .......................... 712/17; 708/401
(58) Field of Classification Search .................. None
See application file for complete search history.

(56) References Cited

U.S. PATENT DOCUMENTS

| | | | | |
|---|---|---|---|---|
| 5,151,971 A | * | 9/1992 | Jousselin et al. | 706/41 |
| 5,644,517 A | * | 7/1997 | Ho | 708/401 |
| 5,842,034 A | * | 11/1998 | Bolstad et al. | 712/11 |
| 7,031,994 B2 | * | 4/2006 | Lao et al. | 708/400 |
| 2002/0032710 A1 | * | 3/2002 | Saulsbury et al. | 708/400 |
| 2006/0010181 A1 | | 1/2006 | Eleftheriou et al. | |
| 2006/0161607 A1 | * | 7/2006 | Gustavson et al. | 708/200 |

OTHER PUBLICATIONS

P. Wapperoma, et al., A new transpose split method for three-dimensional FFTs: performance on an Origin2000 and Alphaserver cluster, Parallel Computing 32, 2006, pp. 1-13.
L. Chen, et al., Optimizing the Fast Fourier Transform on a Multicore Architecture, Int'l Parallel and Distributed Processing Symposium, Mar. 2007, pp. 1-8.
H.S. Cohl et al, Parallel Implementation of a Data-Transpose Technique for the Solution of Poisson's Equation in Cylindrical Coordinates, Proc. 8th SIAM Conf. PPSC, Mar. 1997, 1-8.
Jaeyoung Choi et al., Parallel Matrix Transpose Algorithms on Distributed Memory Concurrent Computers, In Proc. of Scalable Parallel Libr. Conf., Oct. 1993, pp. 1-32.
IBM/Sony, Cell Broadband Engine Architecture, Handbook, Version 1.01, Oct. 3, 2006, pp. 1-352, http://cell.scel.co.jp/e_download.html. Tokyo, Japan.

* cited by examiner

*Primary Examiner* — Kenneth S Kim
(74) *Attorney, Agent, or Firm* — Kenneth L. Sherman, Esq.; Michael Zarrabian, Esq.; Myers Andras Sherman & Zarrabian LLP

(57) ABSTRACT

A method and system for transposing a multi-dimensional array for a multi-processor system having a main memory for storing the multi-dimensional array and a local memory is provided. One implementation involves partitioning the multi-dimensional array into a number of equally sized portions in the local memory, in each processor performing a transpose function including a logical transpose on one of said portions and then a physical transpose of said portion, and combining the transposed portions and storing back in their original place in the main memory.

19 Claims, 13 Drawing Sheets

ZYX  YZX

Rows of each face are stored in different order to achieve zy swapping using vector store libraries

YZX  YXZ xz face is transposed using vector shuffling & permutation libraries

Rows of each face are stored in different order to achieve zy swapping using vector store libraries xz face is transposed using vector shuffling & permutation libraries

US 7,979,672 B2

MULTI-CORE PROCESSORS FOR 3D ARRAY TRANSPOSITION BY LOGICALLY RETRIEVING IN-PLACE PHYSICALLY TRANSPOSED SUB-ARRAY DATA

BACKGROUND OF THE INVENTION

1. Field of the Invention

The present invention relates generally to multi-dimensional data processing applications and in particular to transposing three dimensional (3D) arrays for multi-core processors.

2. Background Information

Transposing three dimensional (3D) arrays is a fundamental primitive operation used in many multi-dimensional data processing applications. Examples include seismic, medical imaging, media industry for 3D TV, biomedical, and 3D Fast Fourier Transform (FFT) applications. 3D FFT in turn is used in solving many mathematical problems including Poisson's equation in cylindrical coordinates, partial differential equations and x-ray diffraction data processing. Conceptually, 3D transpose simply changes the order of axis along dimensions; for example, given 3D data ordered in XYZ axis order, one 3D transpose operation would be to change the order to ZXY. However, with large data sets, as typical in above applications, such operation is challenging even for a massively parallel computing system. The operation is memory bound rather than computation bound; it involves much data communication and displacement rather than processing.

Conventional approaches to 3D transpose operations may be grouped into two approaches: The first approach physically reorders the data while the second approach performs reordering logically without moving any data. The latter approach does not require any data movement operation; however, it is not necessarily as efficient as the first approach, especially when memory is organized in a hierarchical structure. Memory hierarchy favors accessing data in blocks, thereby decreasing communication latencies. Moreover, usually the transposed data are later "stream" processed, which again require accessing data in blocks. Logical transpose accesses data in small granular level (at element level) fashion, which does not interface well with the underlying memory and processing architecture. Further, there is an associated mapping overhead. Therefore, physical transpose is usually preferred.

Performing physical transpose however has several shortcomings. One shortcoming involves the fact that it is usually sought to have the data transposed in-place to conserve memory (given large data size). This introduces complexity on the order of transpose and may limit the effective memory bandwidth, especially on shared-memory parallel systems. A second shortcoming involves the fact that all the data is transposed even if only a small subset is required (that will be the case if data access later on is sparse).

SUMMARY OF THE INVENTION

The invention provides a method and system for transposing a multi-dimensional array for a multi-processor system having a main memory for storing the multi-dimensional array and a local memory. One embodiment involves partitioning the multi-dimensional array into a number of equally sized portions in the local memory, in each processor performing a transpose function including a logical transpose on one of said portions and then a physical transpose of said portion, and combining the transposed portions and storing back in their original place in the main memory.

Partitioning the multi-dimensional array into a number of equally sized portions in the local memory may include partitioning the multi-dimensional array into a number of equally sized portions, wherein the number of portions is equal to the number of processors in said multi-processor system.

Partitioning the multi-dimensional array into a number of equally sized portions in the local memory may further include partitioning the multi-dimensional array into a number of equally sized rows, wherein the number of rows is equal to the number of processors in said multi-processor system.

Partitioning the multi-dimensional array into a number of equally sized portions in the local memory further may further include associating each row with a processor among the processors of said multi-core processor system.

Performing a transpose function in each processor may include partitioning each associated row into plural matrices in the local memory, and transposing each matrix in the local memory.

Combining the transposed portions and storing back in their original place in the main memory may further include combining the transposed matrices into a new row in said local memory, and storing back the new row from local memory to its original position in the main memory. The multi-dimensional array may comprise a three dimensional (3D) array.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

Figure 1:
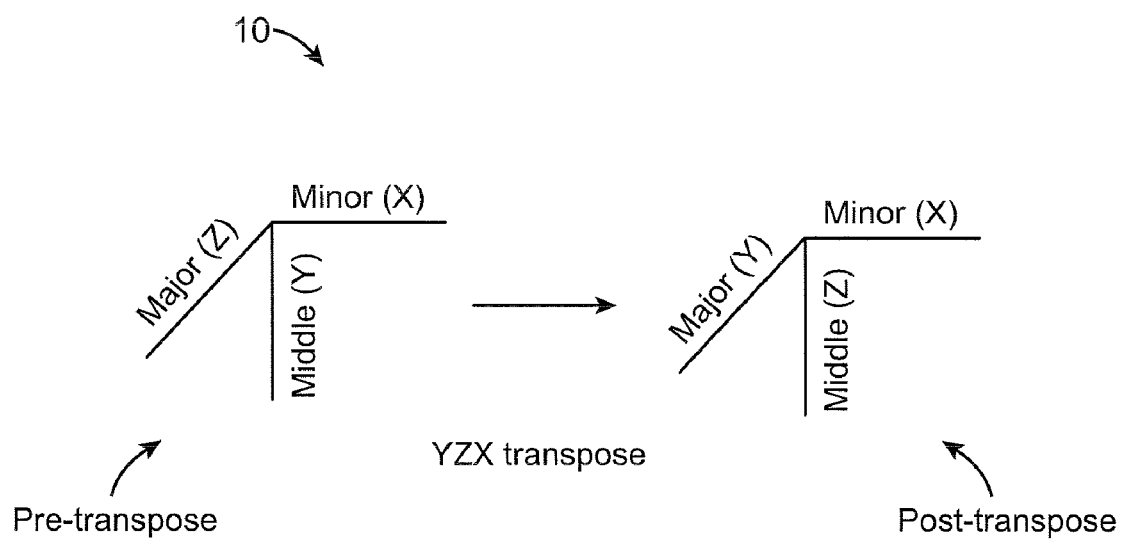
FIG. 1 shows axes of an example multi-dimensional array, naming and usage, according to an embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides a method and system for in-place multi-dimensional transpose for multi-core processors with software-managed memory hierarchy. One embodiment provides a three dimensional (3D) transpose operator for multi-core (multi-node) processors with software managed memory hierarchy, for target domain of shared-memory architecture in a multi-core paradigm.

The 3D transpose operator performs logical transpose on sub-parts (e.g., cubes) of the 3D array, rather than the entire 3D array. The operator then performs a physical transpose on each cube. Such two-level decomposition matches the requirements of logical and physical transpose approaches. Utilizing cubes as logical access units removes a substantial amount of logical mapping, and performing transposes only when needed (i.e., lazy transpose) decreases on-chip memory communication bandwidth requirements. Physical transpose of intra-cube elements allows for high memory access bandwidth and properly orders data for single instruction multiple data (SIMD) stream processing.

Preferably, said transpose levels (logical and physical) are processed in parallel, wherein each processor core is associated with a cube in which a physical transpose is performed. An application programming interface (API) function is then responsible for the logical mapping, which in turn is executed in parallel. Transposing performed on multi-core processors with software managed memory hierarchy. Transpose is performed lazily wherein transposing the entire 3D array is not performed when the array is sparsely accessed. This reduces on-chip memory bandwidth requirements. Transpose operations occur at the intra-cube level, providing efficient memory access and allowing for streaming SIMD processing. Further, transpose operations occur in-place, which contrasts with conventional physical transpose approaches where parallel in-place operation is complex.

An implementation is now described for a Cell Broadband Engine (BE) processor manufactured by IBM. An example multi-core processor with software managed memory hierarchy is a Cell BE processor by IBM (A version of the Cell BE processor is described in IBM Cell BroadBand Engine Architecture, Hand book, Version 1.01, October 2006, incorporated herein by reference). The Cell BE processor includes a multi-core chip comprising a 64-bit Power Architecture processor core and eight synergistic processor cores, capable of massive floating point processing, optimized for compute-intensive workloads and broadband rich media applications. A high-speed memory controller and high-bandwidth bus interface are also integrated on-chip. The Cell BE software-managed parallel processing system is typically used in the application domains where 3D transpose operation is significant. The Cell BE is a multi-core processor that provides for a large centralized shared memory (off chip), and small local memories for 8 synergistic processing elements (SPEs). Such architecture, as well as similar software-managed memory hierarchies, provide for memory transfers and process computation to operate in parallel.

An example 3D transpose operation on such a processor involves transposing a 3D array (3D matrix) as a "cuboid", according to an embodiment of the invention. A cuboid has the dimensions of L×M×N corresponding to the axes X, Y, and Z, respectively. The values L, M, N need not be the same. As shown by example transpose 10 in FIG. 1, a transpose operation changes the order of the cuboid axes X, Y, and Z. The axes X and Y of the cuboid before the transpose are in the plane of the drawing page while the Z axis is perpendicular to the plane of the drawing page. The axes X and Z of the cuboid after transpose are in the plane of the drawing page while the Y axis is perpendicular to the plane of the drawing page.

A three-letter string is used herein to specify the sought axes order. For example, the transpose YZX operation exchanges axis Y and Z in original ZYX order. To avoid confusion from original and desired axis names, a distinction is made between cuboid axis and baseline axes. The latter are fixed and labeled as major, middle, and minor, corresponding to the original cuboid X, Y, Z axes order, respectively. FIG. 1 shows the use of such naming while performing an YZX transpose.

A cuboid 11 (FIG. 2) includes multiple rows. The cuboid 11 is divided into plural small cubes 12 (3D matrix), each of dimension p×p×p. As such, the cuboid dimensions L, M, N are divisible by p. A row (in the minor axis direction) of each cuboid is referred to as a bar 13. The cuboid is assumed to be stored in the processor (computer) main memory in major-middle-minor axes order. Middle-minor planes (for cuboid, bars, and cubes) are qualified as faces 14. As noted, cube comprises a 3D matrix, smaller than the 3D array (e.g., for a 3D matrix of size 256×128×64, a possible cube size may be 4×4×4; thus the 3D array would be decomposed into 32768 cubes). Each element of the cube (or 3D matrix) is a scalar number (value).

A process for transposing a cuboid (3D array) in a multi-core processor system, according to an embodiment of the invention is now described. The multi-core processor system includes a main memory for storing the 3D array, and a local memory. Generally the process involves partitioning (dividing) the 3D array into a number of equally sized bars (rows), wherein the number of bars is equal to the number of processors (cores) in said multi-core processor system. Each bar is associated with a given processor among the processors of said multi-core processor system. Each given processor is programmed to: partition (divide) each associated bar into plural matrices (e.g., cubes) in the local memory, transpose each cube, combine the transposed cubes into a bar in said local memory, and to store back the bar from local memory to its original position in the main memory.

Table 1 below shows an example pseudo-code process for said transpose operation. The 3D array is in main memory and bars are moved to local memory (step 5 of Table 1), and cubes are extracted from local stores.

TABLE 1

Transpose Cuboid Operation Steps

1: Chop the cuboid into bars each of dimensions p × p × N,
2: Distribute the bars evenly among processors,
3: Each processor perform the following steps 3-10 in parallel:
4: For each bar associated with this processor do:
    {
5:     Read bar from main memory into local memory,
6:     Chop the bar into p × p × p cubes inside local memory,
7:     For each cube do:
        {
8:         Transpose Cube
        }
9:     Combine cubes into a bar,
10:    Write back the bar from local memory into its original
       place in main memory
    }.

Figure 2:
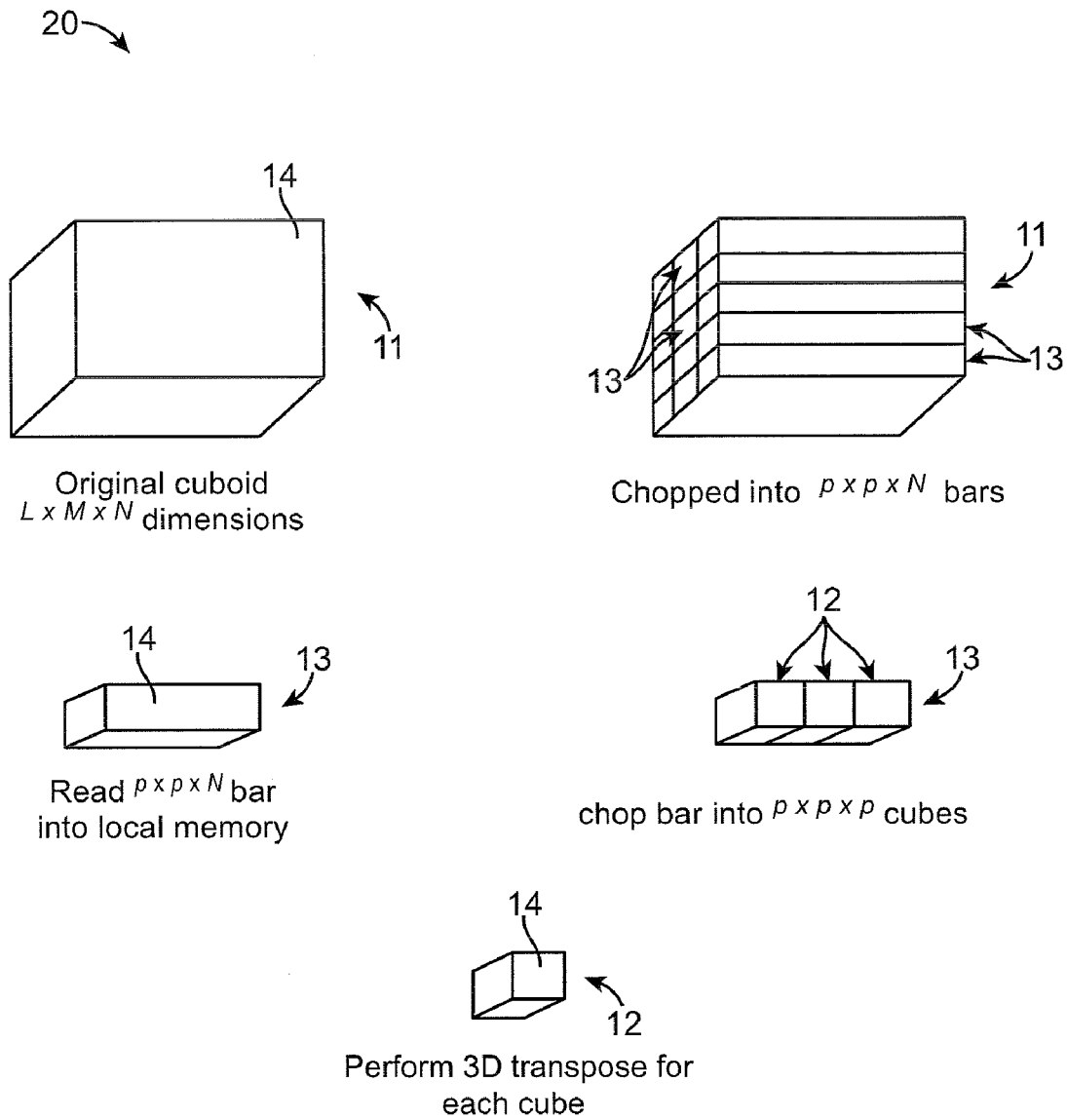
FIGS. 2-3 show graphical illustrations of three dimensional (3D) data restructuring for in-place transpose, according to an embodiment of the invention.
Figure 3:
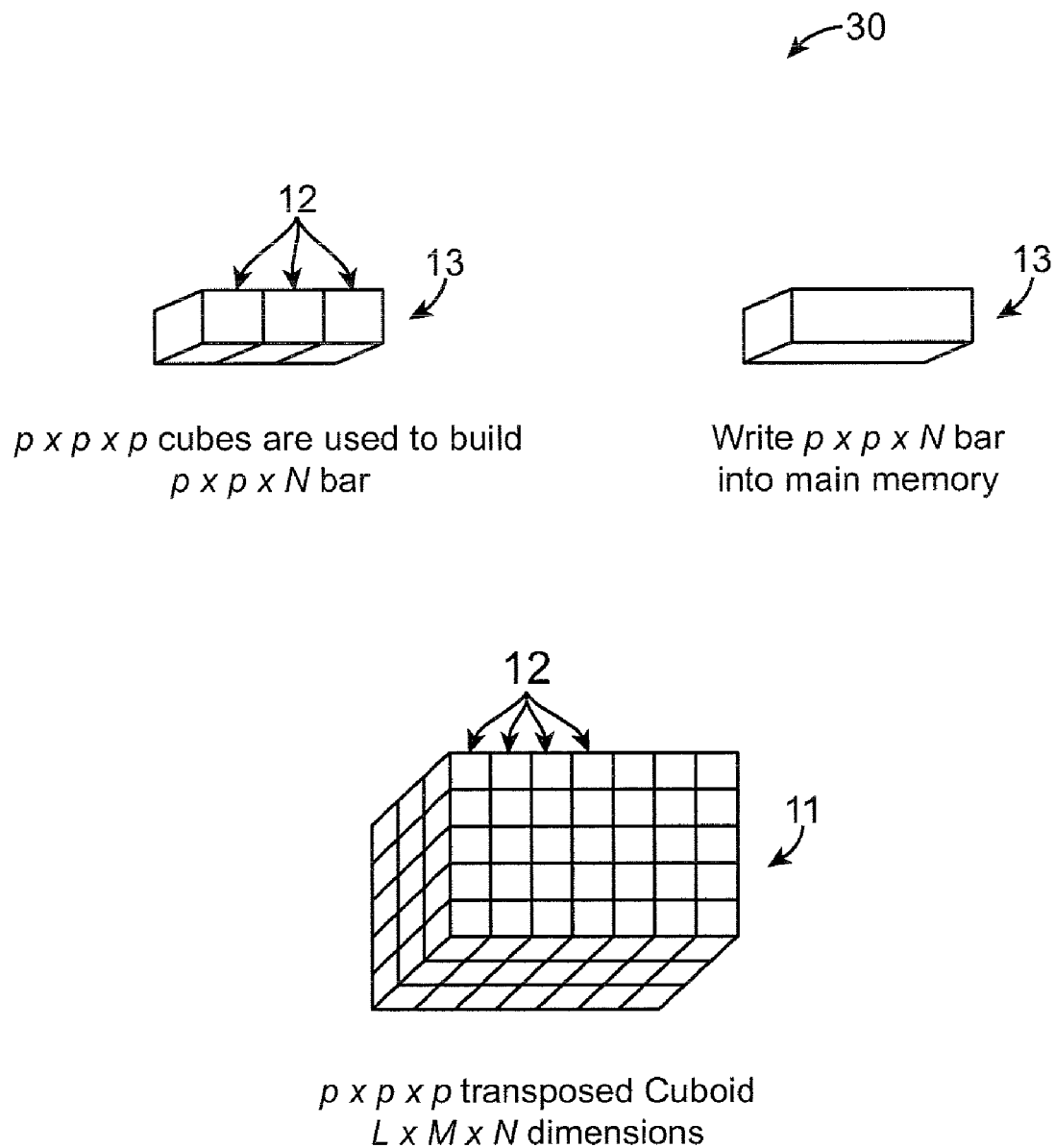
Figure 4:
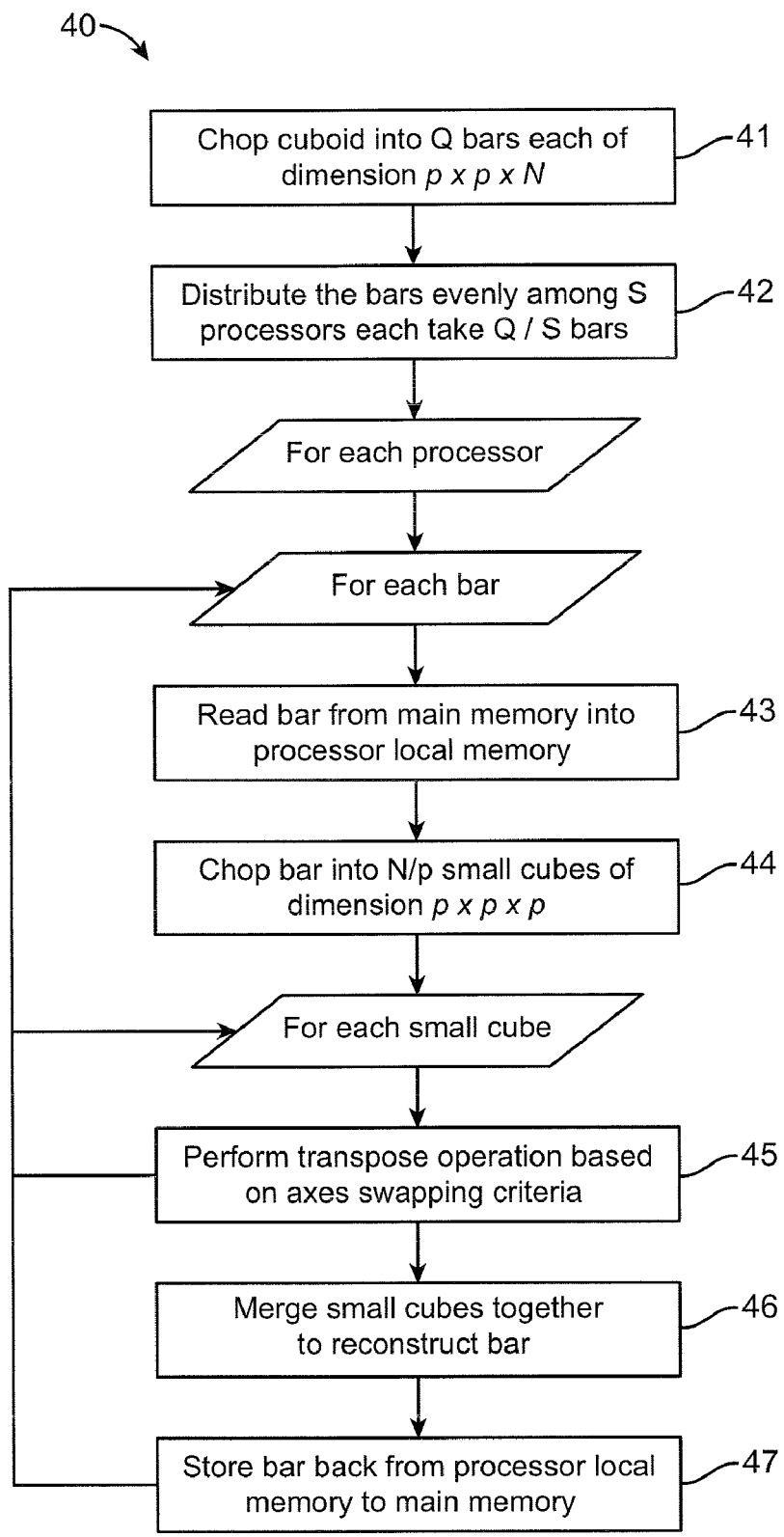
FIG. 4 shows a flowchart of a transpose process for 3D data restructuring for in-place transpose of a 3D-array, according to an embodiment of the invention.

FIG. 2 shows a graphical example 20 of the transpose steps 1-8 above, wherein a cuboid is transposed in place. FIG. 3 shows a graphical example 30 of the transpose steps 9 and 10 above. FIG. 4 shows a flowchart of an example transpose process 40 for 3D data restructuring for in-place transpose according to the invention. Process block 41 begins by chopping the cuboid into bars of equal dimensions p×p×N. Each bar face is stored contiguously inside main memory (stride-1 order). Such order is efficient in data transfer from main memory to local memories. In current multi-cores, the larger the stride-1 access pattern is, the higher the achieved memory bandwidth. In block 42, after obtaining bars, the process utilizes the parallel processors to speedup the transpose operation. That is achieved by distributing bars to processors.

Each processor transposes its share of bars. In block 43, each bar is loaded from main memory and stored into the local memory of the corresponding processor. The loading operation is rapid due to bar organization as mentioned above. In block 44 the processor then chops the bar into cubes. The chopping into cubes occurs in local memory and in parallel (each processor is performing the same for its corresponding bar). Moreover, memory transfer and processor processing occurs in parallel, thus chopping and loading bars may be overlapped. Therefore, the chopping operation does not introduce overheads. In block 45, each processor now has a current bar chopped into cubes, and proceeds to transpose each cube in local memory. In block 46 each processor combines transposed cubes into bars, then in block 47 stores back the bar into its original position. Operations in blocks 46 and 47 are the opposite to the bar reading and chopping operations in blocks 43 and 44, respectively.

Upon completion, data inside each cube is transposed, but not cube locations. Post-transpose programs that access the cuboid may utilize a logical mapping to access a particular cube. Such mapping is trivial (merely require reordering cube coordinates as per transpose string) and may be provided by a simple cube mapping function, or coded directly by a programmer. Moreover, the programmer may use the same bar access step, defined above, for accessing many cubes at once, saving memory transfer time (if access pattern permits).

An example cube transpose operation for the cuboid transpose operation above is now described. The cube transpose operation is useful with all possible transposes that may be performed on a p×p×p cube. Vectorization is used to achieve high performance of element displacement. For a p×p×p, ZYX cube, cube elements for all x values for x=1 to p for a given z and y are to be defined as yz cube row. Only two adjacent axes are swapped at each single step (i.e., swap is either between major and middle, or between middle and minor, axes). Thus, a maximum of three swap operations are required for any cube transpose.

Major-middle swapping is performed by reordering of the cuboid rows. As such, each yz row is swapped with zy row. This swapping is performed by simple out of place memory copying from the source to a temporary destination (for the Cell BE computer, this memory copy and swap process is performed using SPU C intrinsics (load/store) to achieve the highest performance).

Figure 5:
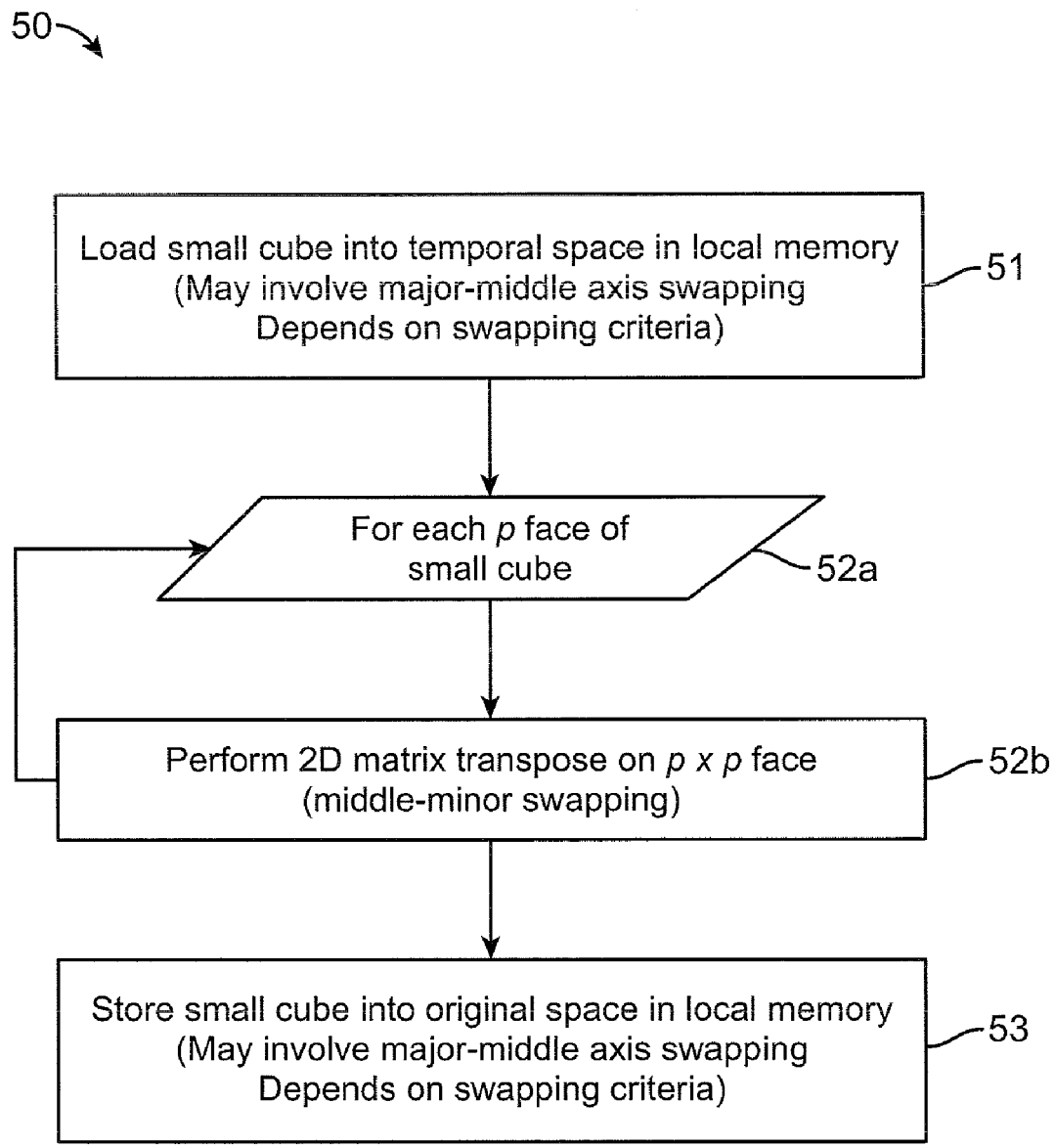
FIG. 5 shows a flowchart of a transpose process for 3D data restructuring of a cube portion of the 3D array, according to an embodiment of the invention.

Middle-minor swapping comprises a 2D transpose for one face of the p×p×p cuboid, to be performed p times for the p faces of the cube. Any efficient 2D transpose algorithm may be used (for the Cell BE computer, the transpose_matrix function from the SDK library may be used). In order to achieve 3D transpose of a cube, a transpose process 50 shown in FIG. 5 involves:

Step 51: Load a cube into a temporary empty space from source bar in local memory.
Steps 52a-b: Perform face transpose on each of the p faces of the p×p×p cube in the temporary space.
Step 53: Store cube from temporary space into destination bar.

Steps 51 and 53 may or may not involve major-middle axis swapping depending on the requested transpose (which is one out the five possibilities described further below). Further, steps 52a-b may or may not be performed based on the requested transpose. Possible transposes for a cuboid are the following (note that the trivial no transpose case is omitted):
cw: Clockwise rotation (ZYX→XZY).
ccw: Counter Clockwise rotation (ZYX→YXZ).
xy: XY swapping (ZYX→ZXY).
xz: XZ swapping (ZYX→XYZ).
yz: YZ swapping (ZYX→YZX).

Figure 6:
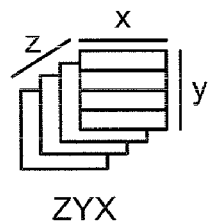
FIGS. 6 and 7 show graphical and process illustrations, respectively, of clockwise rotation for transposing a cube, according to an embodiment of the invention.
Figure 6:
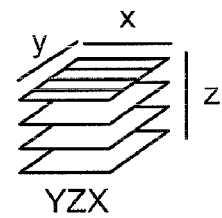
Figure 6:
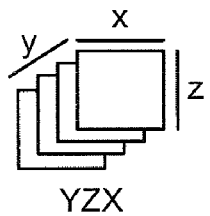
Figure 6:
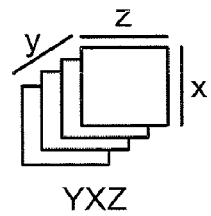
Figure 7:
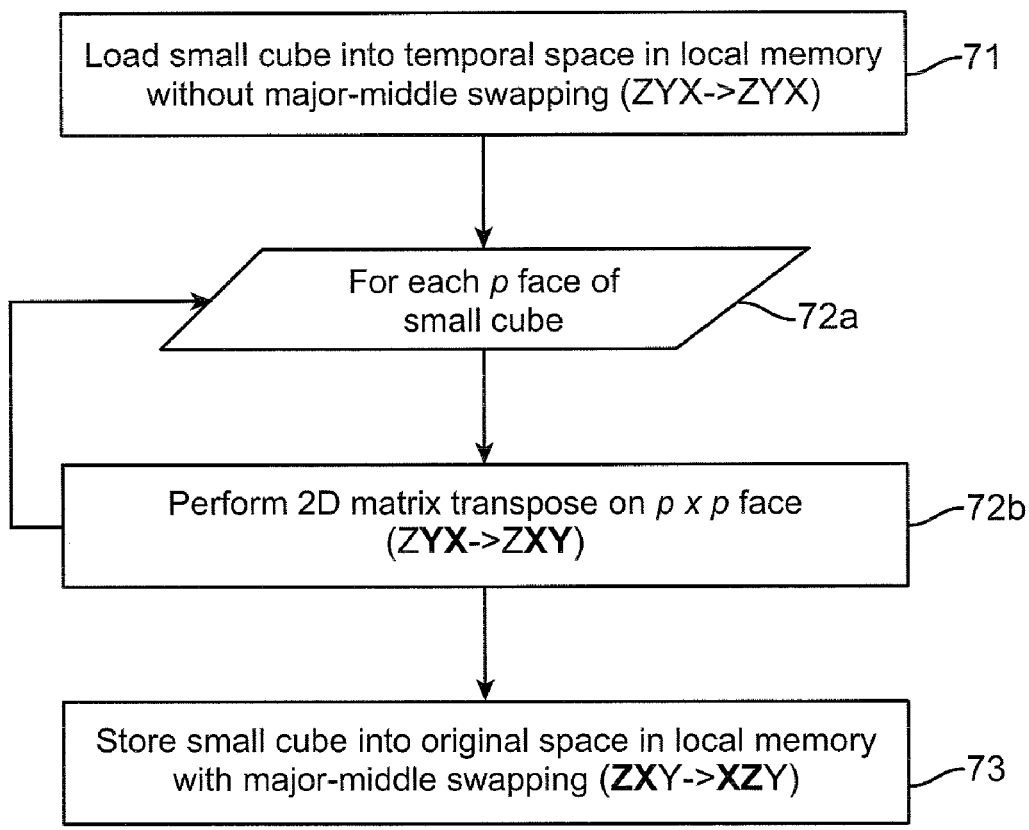

Referring to the graphical example 60 in FIG. 6 and example process 70 in FIG. 7, clockwise rotation (i.e., cw (ZYX→XZY)) involves the following:
Step 71: Load a cube into temporary space with no major-middle swapping (ZYX→ZYX).
Steps 72a-b: Perform face transpose on each of the p faces of the p×p×p cube in the temporary space. This involves middle-minor swapping (ZYX→ZXY).
Step 73: Store the cube from temporary space into destination bar (at local memory) with major-middle swapping (ZXY→XZY).

Figure 8:
FIGS. 8 and 9 show graphical and process illustrations, respectively, of counter clockwise rotation for transposing a cube, according to an embodiment of the invention.
Figure 8:
Figure 9:
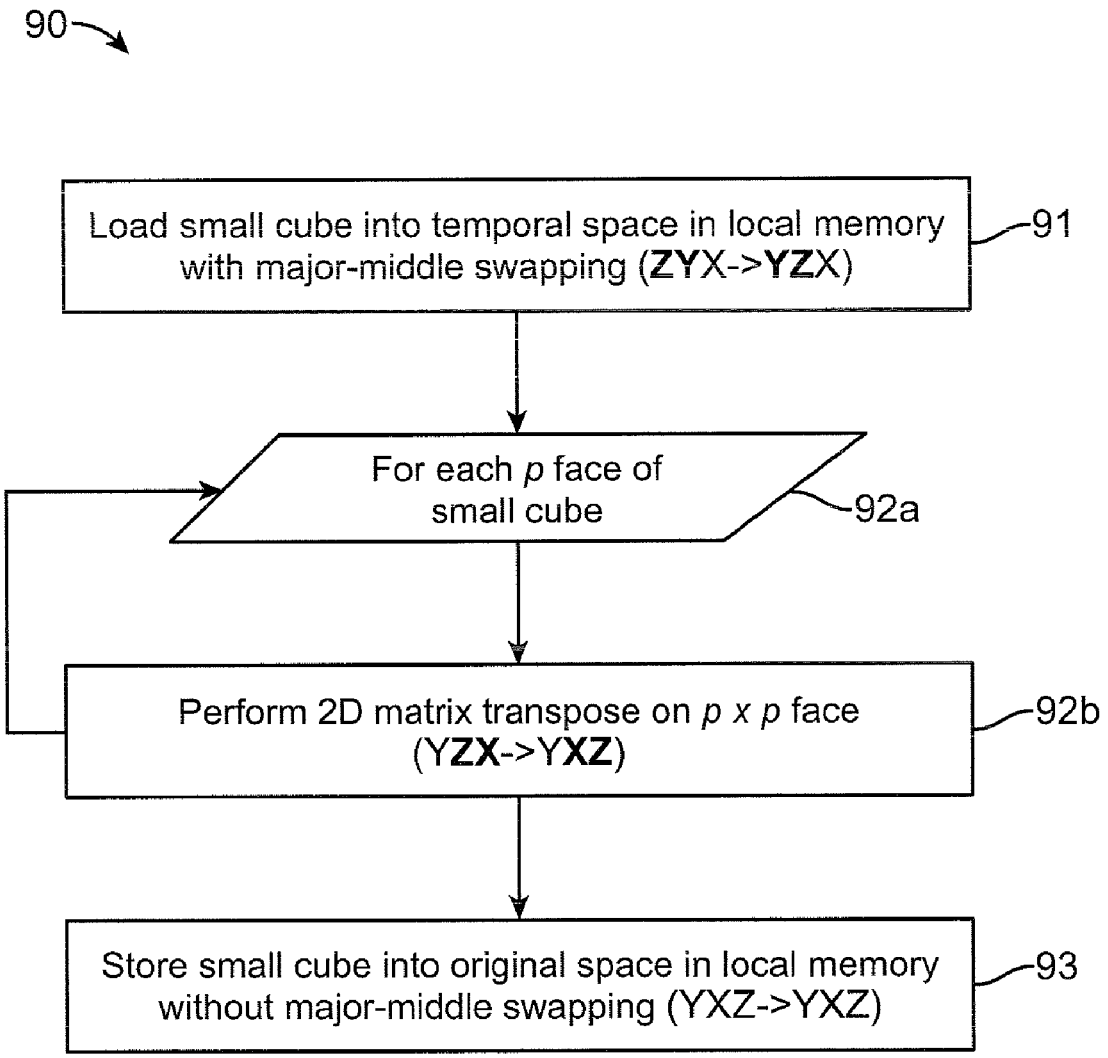

Referring to the graphical example 80 in FIG. 8 and example process 90 in FIG. 9, counter clockwise rotation (i.e., ccw (ZYX→YXZ)) involves the following:
Step 91: Load a cube into temporary space with major-middle swapping (ZYX→YZX).
Steps 92a-b: Perform face transpose on each of the p faces of the p×p×p cube in temporary space, This involves middle-minor swapping (YZX→YXZ).
Step 93: Store the cube from temporary space into destination bar (at local memory) with no major-middle swapping (YXZ→YXZ).

Figure 10:
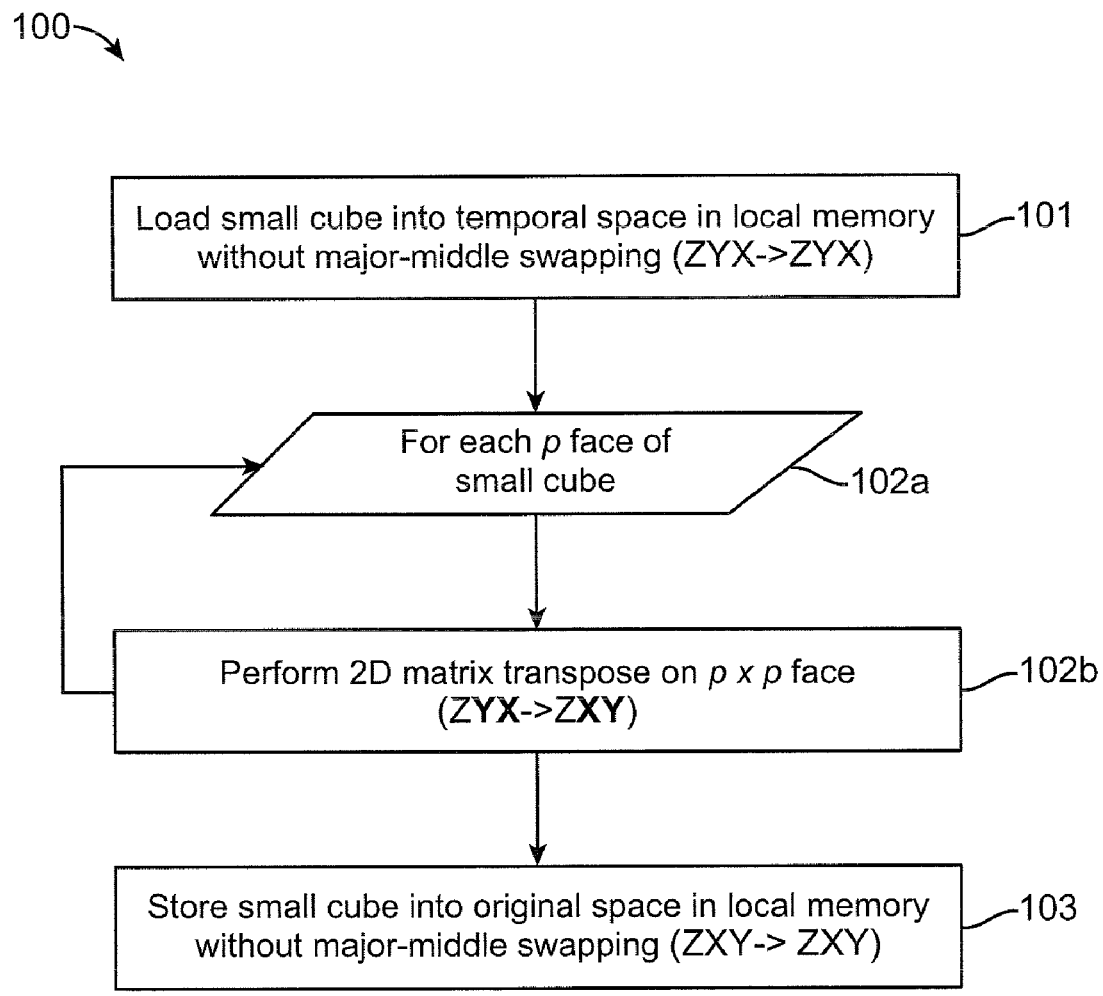
FIGS. 10-12 show a process for axis swapping in a transpose operation, according to an embodiment of the invention.

Referring to the example process 100 in FIG. 10, XY axis swapping (i.e., xy (ZYX→ZXY)) involves the following:
Step 101: Load a cube into temporary space with no major-middle swapping (ZYX→ZYX).
Steps 102a-b: Perform face transpose on each of the p faces of the p×p×p cube in temporary space. This involves middle-minor swapping (ZYX→ZXY).
Step 103: Store the cube from temporary space into destination bar (at local memory) with no major-middle swapping (ZXY→ZXY).

Figure 11:
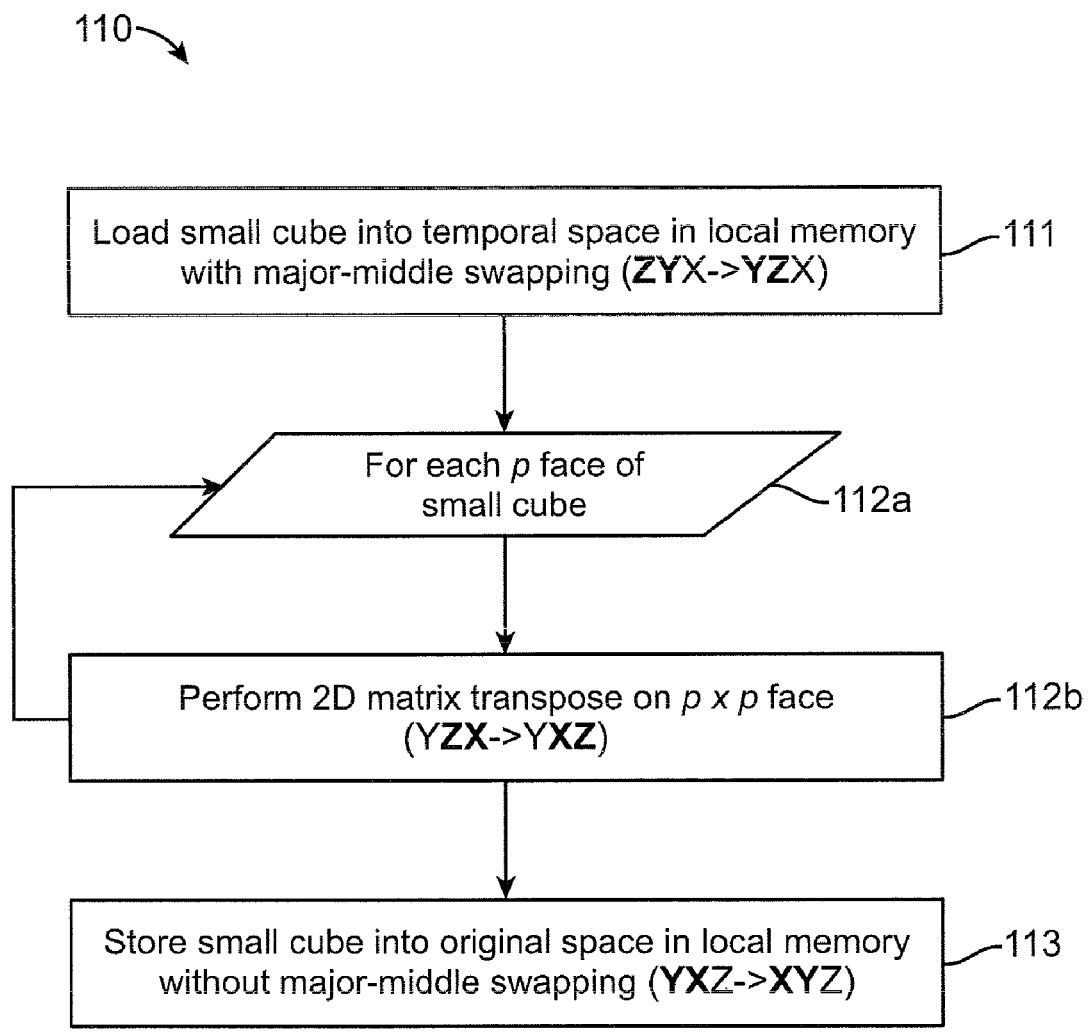

Referring to the example process 110 in FIG. 11, XZ axis swapping (i.e., xz (ZYX→XYZ)) involves:
Step 111: Load a cube into temporary space with major-middle swapping (ZYX→YZX).
Steps 112a-b: Perform face transpose on each of the p faces of the p×p×p cube in temporary space. This involves middle-minor swapping (YZX→YXZ).
Step 113: Store the cube from temporary space into destination bar (at local memory) with major-middle swapping (YXZ→XYZ).

Figure 12:
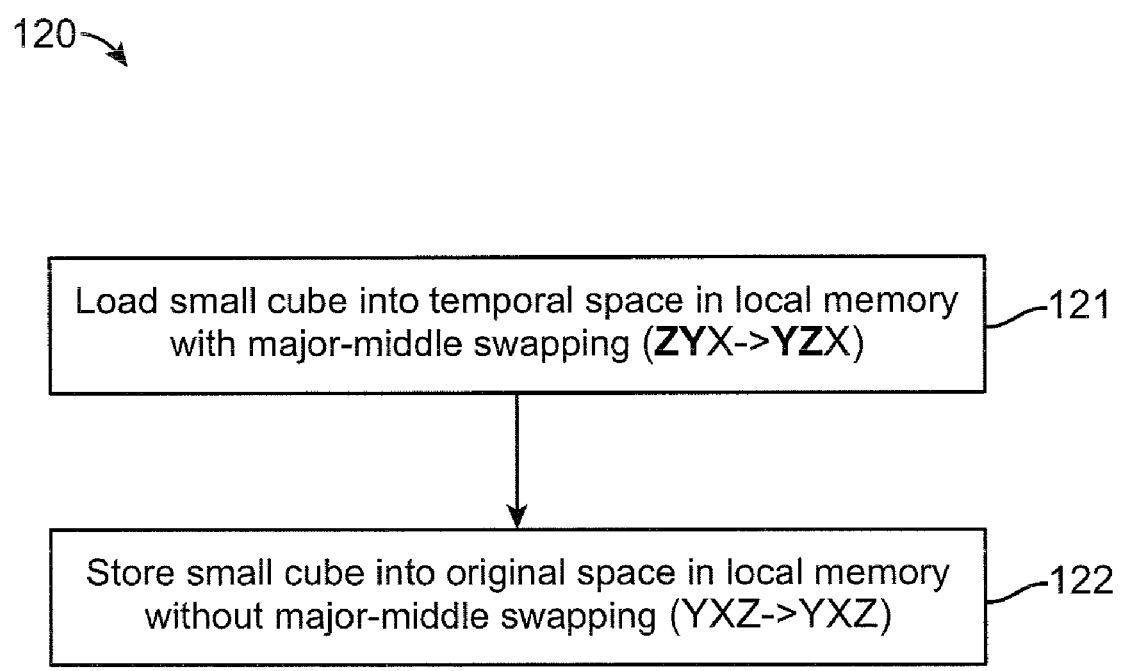

Referring to the example process 120 in FIG. 12, YZ axis swapping (i.e., yz (ZYX→YZX)) involves:
Step 121: Load a cube into temporary space with major-middle swapping (ZYX→YZX). No middle-minor swapping (YZX→YZX).
Step 122: Store the cube from temporary space into destination bar (at local memory) with no major-middle swapping (YZX→YZX).

After performing the transpose process on all p×p×p cubes and the destination bar is built, the process is reversed and the bar is written back in-place in its original cuboid location into main memory. As such, a preferred embodiment of the invention divides the steps of transpose operations among multiple processing units that process independently along all axes until transpose is completed without inter-process communications. Further, the 3D transpose is performed in-place based on a hybrid/integrated 3D transpose approach including logical and physical processing.

Increasing a cube dimension size cubically increases volume and hence local memory allocated space, whereas decreasing the cube size decreases cube read/write speeds and ultimately the degree of SIMD processing possible. One approach to choosing cube dimension is to choose a suitable size with respect to efficient SIMD processing for the underlying architecture. The sizes should allow for efficient vectorization of the transpose and possibly the post-transpose operations. We then rely on bars to achieve high communication speed.

As discussed above, there are two main operations according to one embodiment of the invention: the first is to physically transpose small 3-D portions on the 3-D array; the second is to make a logical transpose on each access to the said 3-D array, resulting in returning the correct transposed data. The logical transpose merely requires changing the order of the element coordinates for access. In more concrete terms, suppose that we have a 3-D array of N×N×N dimensions. Suppose that the dimensions of the small portions are M×M×M, such that N is an integer multiple of M. Also suppose that the transpose is to change the axis of the N×N×N array from XYZ to YZX. In one embodiment of the invention, all M×M×M portions are physically transposed from XYZ to YZX. For an application to access element (a, b, c) in the N×N×N array, the following steps will be performed:

Target 3-D portion address is computed by ($\lfloor a/M \rfloor$, $\lfloor b/M \rfloor$, $\lfloor c/M \rfloor$)

The portion address is logically transposed by the opposite of the sought transpose; so the address becomes ($\lfloor c/M \rfloor$, $\lfloor a/M \rfloor$, $\lfloor b/M \rfloor$). The sought element is accessed by its offset inside the portion; the offset is (a mod N, b mod N, c mod N). So the complete address becomes ($\lfloor c/M \rfloor$×M+a mod N, $\lfloor a/M \rfloor$×M+b mod N, $\lfloor b/M \rfloor$×M+c mod N).

For ease of understanding, the following example is presented as follows. Take N=4 and M=2. The elements of the 3-D array is indexed by the tuple (i, j, k) where 0≦i≦0, 0≦j≦3, 0≦k≦3.
Suppose for k=0 we have elements (i, j, 0) to be:
 0 1 2 3
 4 5 6 7
 8 9 10 11
 12 13 14 15
where i is the column index and j is the row index.
Suppose for k=1 we have elements (i, j, 1) to be:
 16 17 18 19
 20 21 22 23
 24 25 26 27
 28 29 30 31
Suppose for k=2 we have elements (i, j, 2) to be:
 32 33 34 35
 36 37 38 39
 40 41 42 43
 44 45 46 47
Suppose for k=3 we have elements (i, j, 3) to be:
 48 49 50 51
 52 53 54 55
 56 57 58 59
 60 61 62 63
Suppose that we're transposing such that element (i, j, k) becomes element (j, k, i). In one embodiment of the invention, only all small 2×2×2 portions will be transposed.

Therefore the array after transpose becomes:
Suppose for k=0 we have elements (i, j, 0) to be:
 0 4 2 6
 17 20 18 22
 8 12 10 14
 24 28 26 30
where i is the column index and j is the row index.
Suppose for k=1 we have elements (i, j, 1) to be:
 1 5 3 7
 18 21 19 23
 9 13 11 15
 25 29 27 31
Suppose for k=2 we have elements (i, j, 2) to be:
 32 36 34 38
 48 52 50 54
 40 44 42 46
 56 60 58 62
Suppose for k=3 we have elements (i, j, 3) to be:
 33 37 35 39
 49 53 51 55
 41 45 43 47
 57 61 59 63
Now suppose it is desired to access element (2, 3, 1). First the portion address is identified to be ($\lfloor 2/2 \rfloor$, $\lfloor 3/2 \rfloor$, $\lfloor 1/2 \rfloor$) which is (1, 1, 0). Then the transpose is made in the opposite direction, so the cube address is (0, 1, 1). The first element address of the portion is (0*2, 1*2, 1*2)=(0, 2, 2). The offset is computed to be (2 mod 2, 3 mod 2, 1 mod 2)=(0, 1, 1). Therefore element (0+0, 2+1, 2+1)=(0, 3, 3) is accessed, which has the value 57 (notice that sought element 2, 3, 1 is element 1, 2, 3 in the original array which is indeed has the value of 57).

Figure 13:
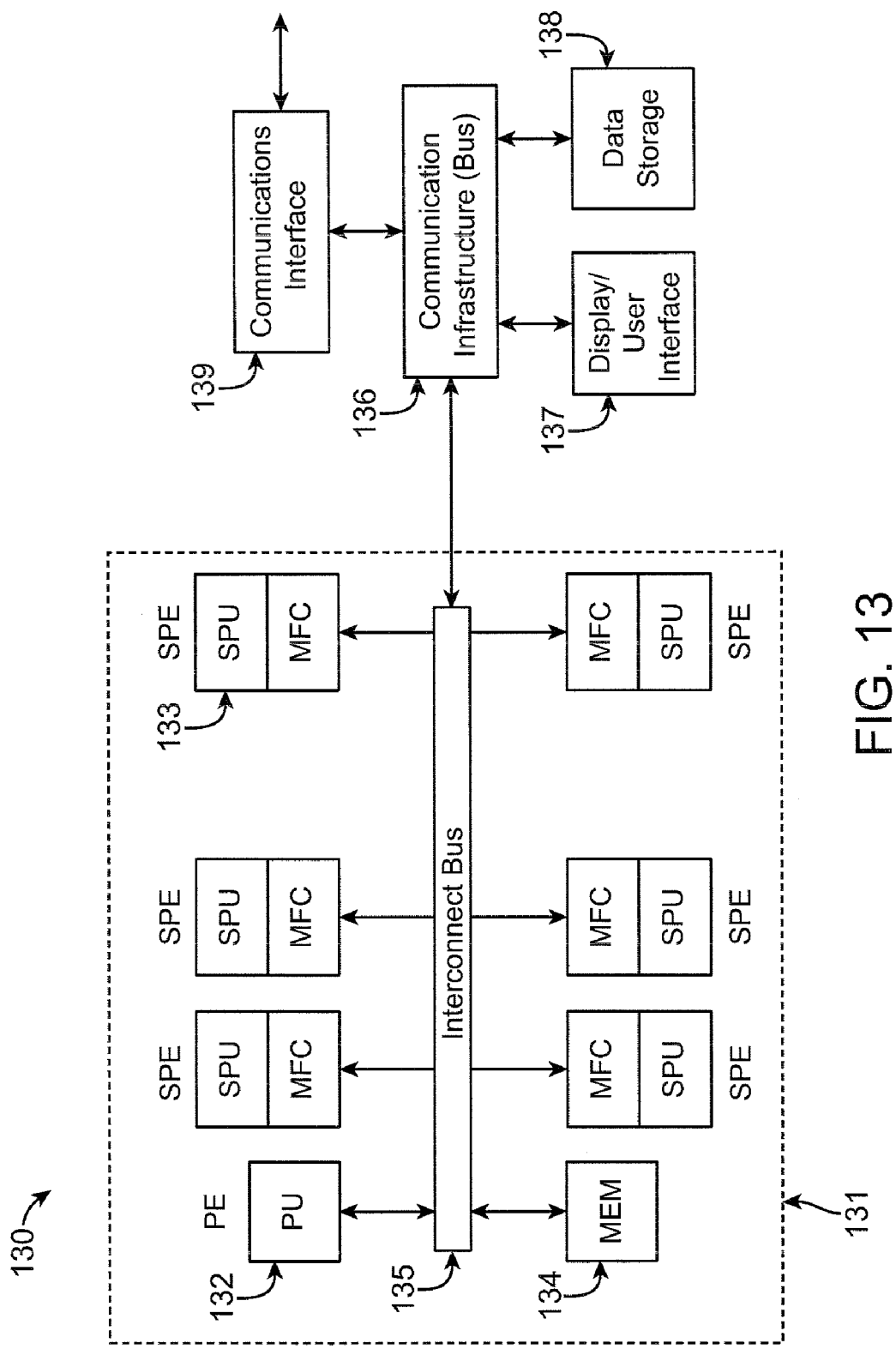
FIG. 13 shows a functional block diagram of a multi-core processor implementing an embodiment of the in-place multi-dimensional transpose, according to an embodiment of the invention.

FIG. 13 shows a functional block diagram of a multi-core processor 130 such as a Cell Broadband Engine Architecture for distributed processing, implementing an embodiment of the in-place multi-dimensional transpose according to the invention. The multi-core processor 130 comprises a processor element (chip) 131 which includes a processor unit (PU) 132 that manages the system and distributes tasks to multiple synergistic processing elements/cores (SPEs) 133. The SPEs are efficient single-instruction, multiple-data (SIMD) processing units optimized for computation and data movement. Each SPE includes a synergistic processor unit (SPU) and a memory flow controller (MFC). The element 131 further includes on-chip local memory (MEM) 134 such as a double-data-rate (DDR2) memory. The PU, SPEs and MEM are connected to an Interconnect Bus 135. One or more elements 131 may be connected to a communication infrastructure 136 for interface with a display/user interface 137, data storage 138 (e.g., main memory, secondary memory, disk, tape), communications interface 139, etc. Various software embodiments are described in terms of this exemplary computer system. After reading this description, it will become apparent to a person of ordinary skill in the relevant art(s) how to implement the invention using other computer systems and/or computer architectures. For example, the PU 132 may partition the 3D array that is in main memory 138, into bars in the local memory MEM 134 and associate each bar with an SPE 133, which SPE then in turn partitions the bar into cubes, transposes each cube, and provides the transposed cubes back from local memory to the PU to combine and place back into main memory.

The terms "computer program medium," "computer usable medium," and "computer readable medium", "computer program product," are used to generally refer to media such main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

As is known to those skilled in the art, the aforementioned example embodiments described above, according to the present invention, can be implemented in many ways, such as program instructions for execution by a processor, as software modules, as computer program product on computer readable media, as logic circuits, as silicon wafers, as integrated circuits, as application specific integrated circuits, as firmware, etc. Though the present invention has been described with reference to certain versions thereof; however, other versions are possible. Therefore, the spirit and scope of the appended claims should not be limited to the description of the preferred versions contained herein. Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of transposing a three-dimensional (3-D) data array for a multi-processor system having multiple processors and a main memory for storing the 3-D data array, the method comprising:
    logically dividing the 3-D data array into a number of equally sized consecutive 3-D first bar portions;
    determining distribution for each first 3-D bar portion evenly among a plurality of processors in the multi-processor system, and storing each first 3-D bar portion in a respective original storage location in the main memory;
    each of the plurality of processors,
        reading the respective first 3-D bar portion from the main memory to a local memory of the respective processor;
        logically dividing the first 3-D bar portion into multiple 3-D cube portions within the local memory of the respective processor, wherein the 3-D cube portions comprise plural data matrices including rows and columns;
        physically transposing elements of each 3-D cube portion by a sequence of interchanging of adjacent axes in a temporary storage location in the respective processor and storing the physically transposed cube elements in the local memory of the respective processor, wherein the 3-D cube portions remain in original physical storage locations with the elements of each 3-D cube portion physically transposed, then:
        combining the 3-D cube portions into a respective second 3-D bar portion in the local memory of the respective processor, wherein the second 3-D bar portion comprises a combined data matrix from the physically transposed matrices of the 3-D cube portions; and
        writing the respective second 3-D bar portions from the local memory of each respective processor to the respective original storage location in the main memory for which the respective first 3-D bar portion was originally stored; and
    obtaining elements of the transposed 3-D data array by logically transposing each 3-D cube portion via address mapping, wherein logically transposing includes:
        determining a 3-D cube address for a 3-D cube portion in the 3-D data array for a given element address;
        inverse transposing the 3-D cube address;
        determining a 3-D entry offset address within the 3-D cube portion; and
        accessing the given element within the 3-D cube portion directly without inversion using the determined 3-D entry offset address.

2. The method of claim 1 wherein
the number of respective first bar portions is equal to the number of processors in said multi-processor system.

3. The method of claim 2 wherein logically dividing the 3-D data array comprises: dividing the 3-D data array into a number of equally sized rows, wherein the number of rows is equal to the number of processors in said multi-processor system.

4. The method of claim 3 wherein logically dividing the 3-D data array into a number of equally sized first bar portions-further includes:
    associating each row with one of the plurality of processors of said multi-core processor system.

5. The method of claim 4 wherein transposing in each processor includes:
    partitioning each associated row into plural matrices in the respective local memory; and
    transposing each matrix in the respective local memory.

6. The method of claim 5 wherein combining the transposed portions and writing back to the respective original storage location in the main memory includes:
    combining the transposed matrices into a new row in respective local memory, and storing back the new row from the respective local memory to the respective original storage location in the main memory.

7. An information processing system comprising:
    a multi-processor system having multiple processors and a main memory for storing a three-dimensional (3-D) data array;
    a controller configured for logically dividing the 3-D data array into a number of equally sized first 3-D bar portions, distributing each first 3-D bar portion evenly among the plurality of processors, and storing each first 3-D bar portion in a respective original storage location in the main memory; and
    each of the plurality of processors configured for reading the respective first 3-D bar portion from the main memory to a local memory of the respective processor;
    logically dividing the first 3-D bar portion into multiple 3-D cube portions within the local memory of the respective processor, wherein the cube portions comprising plural data matrices including rows and columns;

physically transposing elements of each 3-D cube portion by a sequence of interchanging of adjacent axes in a temporary storage location in the respective processor and storing the physically transposed cube elements in the local memory of the respective processor, wherein the 3-D cube portions remain in original physical storage locations with the elements of each 3-D cube portion physically transposed, then:

combining the 3-D cube portions into a respective second 3-D bar portion in the local memory of the respective processor, wherein the second 3-D bar portion comprises a combined data matrix from the physically transposed matrices of the 3-D cube portions; and writing the respective second 3-D bar portions from the local memory of each respective processor to the respective original storage location in the main memory for which the respective first 3-D bar portion was originally stored; and obtaining elements of the transposed 3-D data array by logically transposing each 3-D cube portion via address mapping, wherein logically transposing includes:

determining a 3-D cube address for a 3-D cube portion in the 3-D data array for a given element address;

inverse transposing the 3-D cube address;

determining a 3-D entry offset address within the 3-D cube portion; and accessing the given element within the 3-D cube portion directly without inversion using the determined 3-D entry offset address.

8. The system of claim 7, wherein the number of equally sized first 3-D bar portions is equal to the number of processors in said multi-processor system.

9. The system of claim 8 wherein logically dividing the 3-D data array into a number of equally sized first 3-D bar portions-includes: logically dividing the 3-D data array into a number of equally sized rows, wherein the number of rows is equal to the number of processors in said multi-processor system.

10. The system of claim 9 wherein the controller is further configured for associating each row with a processor among the plurality of processors of said multi-processor system.

11. The system of claim 10 wherein each processor is further configured for:

partitioning each associated row into plural matrices in the respective local memory; and physically transposing each matrix in the respective local memory.

12. The system of claim 11 wherein the controller is further configured for combining the transposed matrices into a new row in respective local memory, and storing back the new row from the respective local memory to the respective original storage location in the main memory.

13. A computer program product, comprising:

a computer readable medium including computer instructions that when executed on a multi-processor system computer having a main memory for storing a three-dimensional (3-D) data array, cause the computer to perform operations comprising:

logically dividing the 3-D data array into a number of equally sized first 3-D bar portions;

distributing each first 3-D bar portion evenly among a plurality of processors, and storing each first 3-D bar portion in a respective original storage location in the main memory;

each of the plurality of processors:

reading the respective first 3-D bar portion from the main memory to a respective local memory;

logically dividing the first 3-D bar portion into multiple 3-D cube portions within the local memory, wherein the 3-D cube portions comprising plural data matrices including rows and columns;

physically transposing elements of each 3-D cube portion by a sequence of interchanging of adjacent axes in a temporary storage location in the respective processor and storing the physically transposed cube elements in the local memory of the respective processor, wherein the 3-D cube portions remain in original physical storage locations with the elements of each 3-D cube portion physically transposed, then:

combining the 3-D cube portions into a respective second 3-D bar portion in the local memory of the respective processor, wherein the second 3-D bar portion comprises a combined data matrix from the physically transposed matrices of the 3-D cube portions; and writing the respective second 3-D bar portions from the local memory of each respective processor to the respective original storage location in the main memory for which the respective first 3-D bar portion was originally stored; and obtaining elements of the transposed 3-D data array by logically transposing each 3-D cube portion via address mapping, wherein logically transposing includes:

determining a 3-D cube address for a 3-D cube portion in the 3-D data array for a given element address;

inverse transposing the 3-D cube address;

determining a 3-D entry offset address within the 3-D cube portion; and accessing the given element within the 3-D cube portion directly without inversion using the determined 3-D entry offset address.

14. The computer program product of claim 13 wherein the number of first 3-D bar portions is equal to the number of processors in said multi-processor system.

15. The computer program product of claim 14 wherein the instructions for logically dividing the 3-D data array into a number of equally sized first 3-D bar portions comprise instructions for:

logically dividing the 3-D data array into a number of equally sized rows, wherein the number of rows is equal to the number of processors in said multi-processor system computer.

16. The computer program product of claim 15 wherein the instructions for distributing each first 3-D bar portion further include instructions for:

associating each row with a processor among the processors of said multi-processor system computer.

17. The computer program product of claim 16 wherein physically transposing each 3-D cube portion include instructions for each processor for:

partitioning each associated row into plural matrices in the respective local memory; and physically transposing each matrix in the respective local memory.

18. The computer program product of claim 17 wherein the instructions for combining the physically transposed 3-D cube portions and writing the respective second 3-D bar portion from the respective local memory to the respective original storage location in the main memory include instructions for:

combining the physically transposed matrices into a new row in respective local memory, and writing the new row from the respective local memory to the respective original storage location in the main memory.

19. A transposition system for transposing a three-dimensional (3-D) data array, comprising:

a multi-processor system having multiple processors and a main memory for storing the 3-D data array, wherein the multi-processor system is configured for:

logically dividing the 3-D data array into a number of equally sized first 3-D bar portions;

distributing each first 3-D bar portion evenly among a plurality of processors in the multi-processor system, and storing each first 3-D bar portion in a respective original storage location in the main memory;

each other processor:

reading the respective first 3-D bar portion from the main memory to a local memory of a respective processor;

logically dividing the first 3-D bar portion into multiple 3-D cube portions within the local memory, wherein the 3-D cube portions comprising plural data matrices including rows and columns;

physically transposing elements of each 3-D cube portion by a sequence of interchanging of adjacent axes in a temporary storage location in the respective processor and storing the physically transposed cube elements in the local memory of the respective processor, wherein the 3-D cube portions remain in original physical storage locations with the elements of each 3-D cube portion physically transposed, then:

combining the 3-D cube portions into a respective second 3-D bar portion in the local memory of the respective processor wherein the second 3-D bar portion comprises a combined data matrix from the physically transposed matrices of the 3-D cube portions; and writing the respective second 3-D bar portions from the local memory of each respective processor to the respective original storage location in the main memory for which the respective first 3-D bar portion was originally stored; and obtaining elements of the transposed 3-D data array by logically transposing each 3-D cube portion via address mapping, wherein logically transposing includes:

determining a 3-D cube address for a 3-D cube portion in the 3-D data array for a given element address;

inverse transposing the 3-D cube address;

determining a 3-D entry offset address within 3-D cube portion; and accessing the given element within the 3-D cube portion directly without inversion using the determined 3-D entry offset address.

\* \* \* \* \*